(12) United States Patent
Pinder (10) Patent No.: US 9,088,552 B2
(45) Date of Patent: *Jul. 21, 2015

(54) METHOD AND APPARATUS FOR KEY DISTRIBUTION USING NEAR-FIELD COMMUNICATION

(75) Inventor: Ellis A. Pinder, Davie, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 223 days.

This patent is subject to a terminal disclaimer.

(21) Appl. No.: 13/308,284

(22) Filed: Nov. 30, 2011

(65) Prior Publication Data

US 2013/0136265 A1 May 30, 2013

(51) Int. Cl.
*H04L 9/08* (2006.01)
*H04L 29/06* (2006.01)
*H04W 12/04* (2009.01)

(52) U.S. Cl.
CPC ............. *H04L 63/065* (2013.01); *H04W 12/04* (2013.01)

(58) Field of Classification Search
CPC .............................. H04L 9/0481; H04W 12/04
USPC ......................................................... 380/279
See application file for complete search history.

(56) References Cited

U.S. PATENT DOCUMENTS

| | | | |
|---|---|---|---|
| 2006/0198520 A1* | 9/2006 | Courtney et al. | 380/247 |
| 2006/0224519 A1* | 10/2006 | Ahn | 705/57 |
| 2007/0015463 A1 | 1/2007 | Abel et al. | |
| 2008/0089519 A1* | 4/2008 | Ekberg | 380/270 |
| 2008/0238676 A1 | 10/2008 | Dhillon et al. | |
| 2008/0267404 A1 | 10/2008 | Budde et al. | |
| 2009/0103733 A1* | 4/2009 | Falk et al. | 380/277 |
| 2009/0235075 A1* | 9/2009 | Cho et al. | 713/170 |
| 2010/0021176 A1* | 1/2010 | Holcombe et al. | 398/115 |
| 2010/0207742 A1 | 8/2010 | Buhot et al. | |
| 2011/0028091 A1 | 2/2011 | Higgins et al. | |
| 2011/0070825 A1* | 3/2011 | Griffin et al. | 455/41.1 |
| 2011/0070826 A1* | 3/2011 | Griffin et al. | 455/41.1 |

(Continued)

FOREIGN PATENT DOCUMENTS

| | | |
|---|---|---|
| WO | 2006129288 A1 | 12/2006 |
| WO | 2010030415 A1 | 3/2010 |

OTHER PUBLICATIONS

B. Benyó; NFC Applications and Business Model of the Ecosystem; Jul. 1-5, 2007; IEEE; pp. 1-5.*
Chen, Yen-Hsing, Near-Field Magnetic Communication; Waseda University; Year: 2006; pp. 1-50.*

(Continued)

*Primary Examiner* — Monjour Rahim
(74) *Attorney, Agent, or Firm* — Barbara R. Doutre; Daniel R. Bestor (57) ABSTRACT

An apparatus and method to provision and distribute a traffic key amongst a plurality of radios enables secure communication, for a predetermined group or a predetermined event. Each radio has a controller, a radio transceiver for electromagnetic radio communications, and a near-field transceiver for near-field communications (NFC). The traffic key (or traffic keys) is provisioned locally at one radio and distributed to the remaining radios utilizing the NFC over a non propagating link. The same traffic key is distributed amongst all radios, and additional restrictions may be applied if desired. The same radios can later be re-provisioned for a different group or event. The local provisioning and distribution is highly advantageous for markets that do not require permanent assignment of radios.

17 Claims, 3 Drawing Sheets

(56) References Cited

U.S. PATENT DOCUMENTS

2011/0070837 A1* 3/2011 Griffin et al. .............. 455/41.3
2011/0212707 A1* 9/2011 Mahalal ....................... 455/411

OTHER PUBLICATIONS

Corresponding International PCT Application No. PCT/US2012/061008—mailing date Feb. 22, 2013.

* cited by examiner

METHOD AND APPARATUS FOR KEY DISTRIBUTION USING NEAR-FIELD COMMUNICATION

FIELD OF THE DISCLOSURE

The present disclosure relates generally to key distribution and more particularly to key distribution using near-field communication (NFC).

BACKGROUND

Communication privacy over two-way way radios is very desirable to many users, such as public safety users in law enforcement, emergency rescue, and fire departments, as well as to business users covering important commercial events, such as political rallies, concerts, and sporting events and the like. There are various techniques for key encryption including dedicated hardware modules and software-based encryption in the radio's existing processor. Additionally, there are various key generation, storage and distribution techniques ranging from complex and expensive to simple and inexpensive.

Many radio users desire some reasonable privacy but do not need or require highly secure (government-grade) cryptography. These users do not want, do not need, and/or are not willing to pay for an expensive Key Variable Loader. Such users may prefer a "software only" approach that uses Customer Programming Software (CPS) to program and manage keys via encryption software running on a processor already present in the radio. However, this software approach still requires a communication cable and a PC or laptop to program keys. This can be inconvenient for keyloading or rekeying a radio, and it can be particularly cumbersome in the field. Users are less likely to change keys, because each radio must encounter a CPS programming station to update the key. The lack of key change may potentially create security issues over time. Those skilled in the art will appreciate the need to coordinate key changes to avoid a disruption in communication. While over-the-air rekeying is a possible approach, however, for some classes of users this technique is too complex and/or too costly as it involves centralized equipment and systems.

The ability to provide increased privacy to various users and applications including public safety, business and even private individuals is thus highly desirable. Accordingly, there is a need for a method and apparatus for improved key distribution.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, in accordance with the various embodiments to be described herein, there is provided a communication system that allows for the secure distribution of cryptographic keys without the need for external hardware, cables, and other devices. Such distribution is provided by data transfer using near-field communication via a non-propagating signal. Key generation may optionally be performed prior to distribution. Identical keys or sets of keys, referred to as traffic keys, are exchanged among a plurality of radios based on an event or a group. Restrictions may be applied as necessary to limit subsequent exchange based on the event or group. The ability to change and distribute traffic keys allows the same radios to be used for different usage environments. For example, rental radios can be programmed and re-programmed for different events or groups, each event or group being covered by secure communications. The ability to reuse radios and provide secure communications is advantageous, particularly in environments where permanent radio assignment is simply not feasible or too costly.

Figure 1:
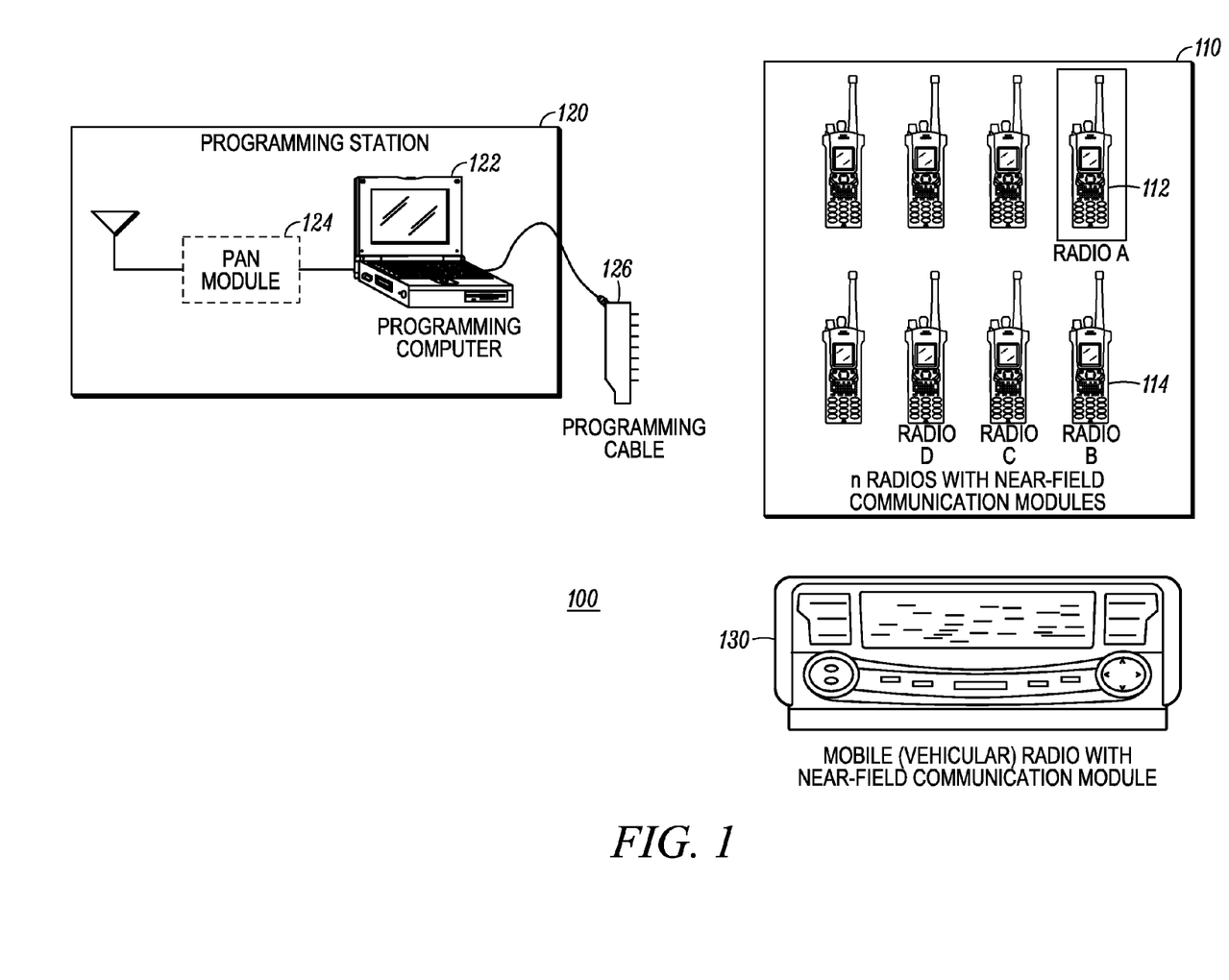
FIG. 1 is a block diagram of a radio fleet and associated programming station in accordance with some embodiments.

FIG. 1 is a block diagram 100 showing a plurality or "fleet" of radios 110 operating in accordance with the various embodiments. Each radio of the plurality of radios 110 is capable of voice and/or data communication using a transceiver capable of long range communication, typically 1 to 100 km using a propagating antenna. Additionally, each radio, such as radio 112, contains a near-field communication (NFC) module capable of data communication limited to a substantially short range as discussed later. The NFC module may be an installable module in the form of an option board, it may be integrated into an external radio accessory (e.g. external speaker microphone), or it may be integrated into the hardware of radio 112 itself.

As shown in FIG. 1, radio 112 is a "portable", or hand-held radio however, the near-field programming capability provided in accordance with the various embodiments can be applied to "mobile", or vehicular, radios such as radio 130, or other form-factors including desk mount or rack mount (not shown). For clarity of illustration, all radios shown in 110 are portable radios, however the invention allows for fleet 110 to include various combinations and form factors. In accordance with the various embodiments, at least one radio of the plurality of radios 110 is preferably a portable/handheld type radio. Additionally, mobile radio 130 may provide different mounting configurations where the "control head"/user interface may be detached from the transceiver partition of the radio to facilitate installation, mounting, and operation. Thus, the control head/user interface is still part of radio 130 even in the detached configuration.

Programming station 120 includes computer 122 and a programming interface to the radio, such as a programming cable 126 or wireless interface PAN module 124. The PAN module 124 may include, but is not limited to Bluetooth, 802.11 communications or the like. The PAN module 124 and programming cable 126 are used for radio firmware programming, radio customization, and/or radio provisioning of configuration data, cryptographic keys, and applications. In accordance with the various embodiments, NFC is used to exchange identical keys or sets of keys among the plurality of radios 110, the exchange being based on an event or a group. The exchange of keys, referred to herein as traffic keys, provides for secure communication based on the event or group. Restrictions may also be applied to limit subsequent exchange from radio to radio. In accordance with the various embodiments, the distribution of traffic keys allows the same radios to be used for different usage environments. For example, the plurality of radios 110 may be marketed as rental radios that can be programmed based on one event or group and then re-programmed for a different event or group, each event or group being covered by secure communications. The plurality of rental radios can thus be re-provisioned with new traffic keys for each rental customer.

Traffic keys may be pre-loaded and the near-field communication used to share the keys between radios. In one embodiment, radio 112 is previously provisioned with at least one cryptographic traffic key via programming station 120. If not pre-loaded, then a user can also manually enter a traffic key at radio 112 or create one or more traffic keys via a random key generation program within the radio. Subsequent to the provisioning of the key, a radio user wishes to share the at least one key from radio 112 with radio 114. Referring to the plurality of radios 110, the technique for exchanging traffic keys takes a master radio, such as radio A 112, provisioned with one or more traffic keys, and distributes the one or more traffic keys amongst the remaining radios. In this example, radio A 112, as the master, must be part of the first exchange. Radio A 112 loads traffic keys to radio B 114. Radio B 114 is now a newly-provisioned radio. Subsequent exchanges may be now done by radio A or by the newly provisioned radio B 114. As more radios are provisioned with traffic keys the distribution of traffic keys can be expedited using NFC links between other radios. The same traffic key(s) is/are shared among radios A, B, C, and D. At the end of the operation, radios A, B, C, and D can communicate securely amongst themselves freely and in any order.

The level of security provided by such an arrangement is intended to benefit groups or events. As the radios are returned at the completion of usage, the same radios can be rapidly and easily re-provisioned, without cable, for different groups or events.

Figure 2:
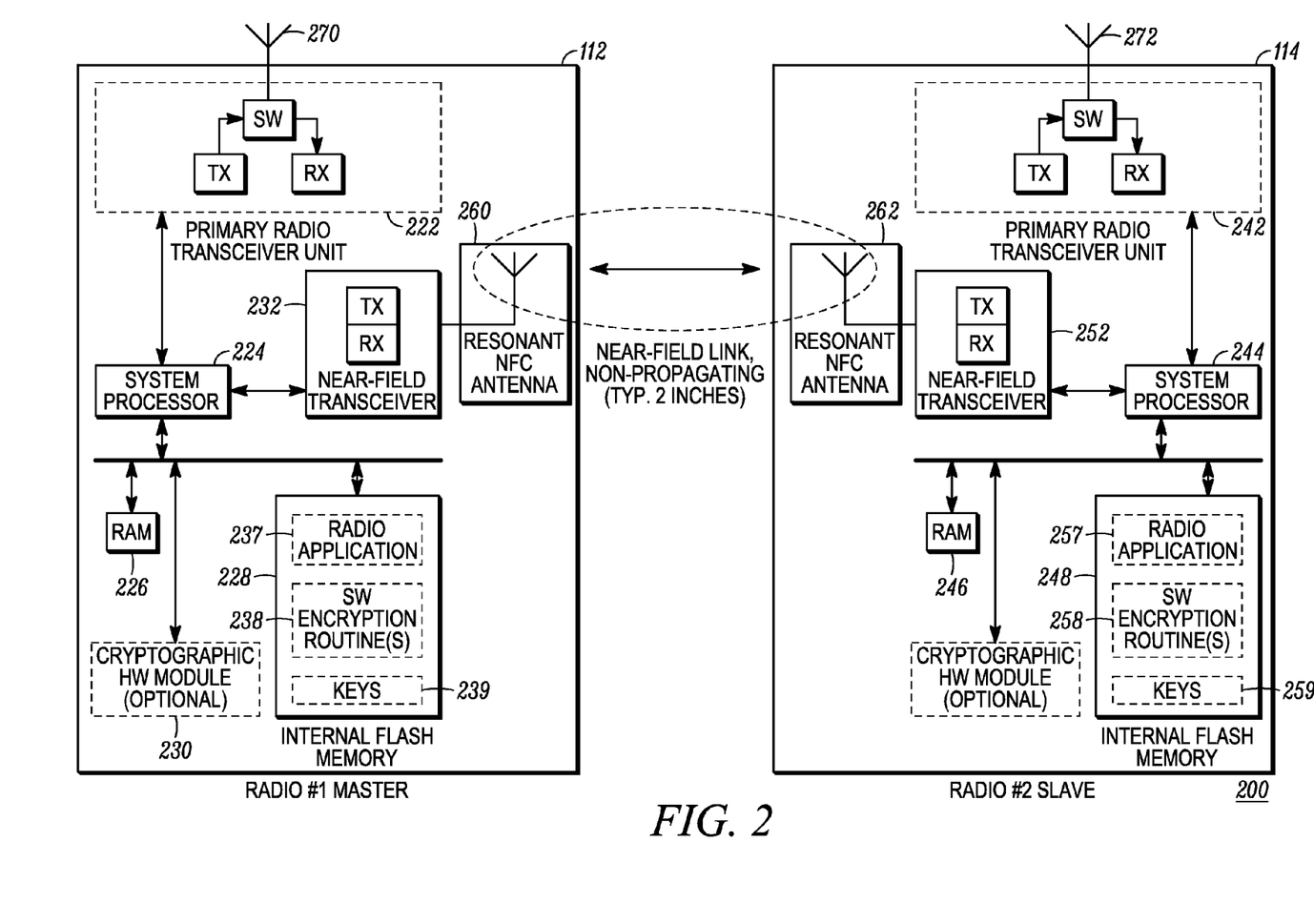
FIG. 2 is a block diagram of two radios engaged in key distribution using near-field communication in accordance with some embodiments.

Referring now to FIG. 2, a block diagram of two radios from FIG. 1 is shown. The radios 112 and 114 in FIG. 2 are labeled Master #1 and Slave #2, respectively, to indicate their assigned roles during NFC operation. It should be noted that these roles may be transient; that is, during one operation a particular radio may be a slave and during a subsequent NFC operation the same radio may be a master. In other words, it is possible that any of the radios in fleet 110 of FIG. 1 can act as either master or slave.

Radios 112 and 114 each contain a primary radio transceiver unit 222, 242 respectively, each capable of long range voice and/or data communication. The primary radio transceiver units 222, 242 are used to allow a radio to communicate within a fleet of radios or to fixed-end equipment, such as a repeater or trunking system. The primary transceivers 222, 242 are shown as half-duplex devices, however, in an alternate embodiment these transceivers can be full-duplex.

Each radio 112, 114 contains a system processor 224, 244 respectively, that controls radio operation. Each system processor 224, 244 may comprise multiple processors and/or cores necessary for radio operation, signal processing, etc. For example, the system processor may contain an ARM processor and a digital signal processor. Each system processor 224, 244 is connected to RAM 226, 246 respectively and to internal flash memory 228, 248 respectively. Each flash memory 228, 248 further comprises, respectively, radio firmware 237, 257; software encryption routines 238, 258; and encryption keys 239, 259. The encryption routine(s) 238, 258 are used to encrypt and/or decrypt voice and data traffic using traffic keys 239, 259. If more than one encryption routine is available then traffic keys may need to be associated with a particular routine to meet its specific requirements. Additionally, each encryption routine may have one or more traffic keys which may be selectable by the user, the channel/talk-group, or by other means.

If a radio, such as radio 112, uses software encryption, then voice/data traffic (hereafter, "traffic data") is accomplished using system processor 224 using at least one of encryption routines 238 and using at least one of keys 239. In an alternate embodiment, radio 112 may include cryptographic hardware module 230 which internally contains hardware and/or software to perform encryption of traffic data. Cryptographic module 230 can be used to provide the highest level of cryptographic security to meet various governmental standards. Accordingly, cryptographic keys used by module 230 can be stored within said module. The presence of cryptographic module 230 is not necessarily mutually exclusive with a software cryptography solution using system processor 224, encryption routines 238, and keys 239. These two techniques can both be present in radio 112, allowing a broader range of traffic encryption and increased interoperability. For example, module 230 may be limited to stronger forms of encryption while software encryption routines 238 may comprise lower-security routines. The co-existence of these two techniques allows radio 112 to potentially interoperate with a larger variety of radios in fleet 110.

Each radio 112, 114 also contains a near-field transceiver, 232, 252, for providing near-field communication with a similarly equipped radio or programming station. In contrast to the primary radio transceiver units 222, 242, which provide long distance communication, near-field transceivers 232, 252 provide a substantially limited range of less than ten meters. In fact, with the appropriately sized NFC antennas 260, 262 and power levels, the range can be limited to less than 10 cm, if desired.

Unlike Bluetooth pairing, which involves creating a substantially unique link key between two devices where only those two devices can communicate with each other using that link key, the key provisioning provided in accordance with the various embodiments provides a distribution of traffic key(s) over a near-field communication link to "n" devices. For example, if five-hundred radios in a system need to communicate with each other using encryption then, in accordance with the various embodiments, all five-hundred radios must have the same traffic key.

Radio 112 and radio 114 may utilize a wireless NFC link over a non-propagating signal to exchange traffic keys. Further description of NFC is described in application Ser. No. 12/534,246 entitled "Method and System for Near-Field Wireless Device Pairing" which is commonly assigned and is hereby incorporated by reference. The cited reference provides a solution to secure Bluetooth pairing, and more particularly, provides a means to safely share a link key between two devices without interception. For example, the cited reference allows radio A to pair with radio devices B, C, and D using three Bluetooth separate pairing operations, each pairing utilizing NFC. Radio A is thus a part of each exchange, and three different link keys are generated (A-B, A-C, A-D). At the end of the operation, radio A can communicate with radio B, radio C, or radio D. However, radios B, C, and D do not communicate amongst themselves.

The various embodiments as provided herein however, utilize NFC to provide local secure programming to numerous devices, without the use of Bluetooth pairing. The traffic key distribution, in accordance with the various embodiments, provides the ability to share one or more traffic keys securely amongst n radios. For example, referring back to FIG. 1, radio A 112 has a traffic key to be shared with radios B, C, and D, and the traffic key contains restrictions based on an event or group. Three distribution operations must happen, each with a different NFC exchange. Radio A must be part of the first exchange, but subsequent exchanges may be done by radio A or by one of the newly provisioned radios (B, C or D). The same traffic key is thus shared among radios A, B, C, and D. At the end of the operation, radios A, B, C, and D can communicate securely amongst themselves freely and in any order. Once programmed, radios A, B, C and D have secure communication over say, a limited time and/or a predetermined location and/or predetermined users. Radios A, B, C, and D being utilized by security personnel to cover events such as concerts, rallies, sporting events, and other events taking place at a certain location, over a period of certain hours, are afforded secure communication. The same radios A, B, C, and D, can then be re-programmed for another event or group at another time.

The radio communication devices from the plurality of radios 110 do not "pair" in the Bluetooth context as the radios A, B, C, and D may still communicate on other channels. No Bluetooth hardware or capability is required to operate the key provisioning in accordance with the various embodiments. The distribution procedure is initiated and completed with the only user input being bringing the first and second communication devices 112, 114 close enough for the first communication device to receive a beacon. The traffic key provisioning provided in accordance with the various embodiments allows for the creation and distribution of on-the-spot keys. Alternatively, keys can be pre-loaded and selected by the user. The use of NFC enables the exchange of the same traffic key or traffic keys over a non-propagating signal between antenna 260 of radio 112 and antenna 262 of radio 114 and similarly amongst the reaming plurality of radios 110.

For the purposes of this application, a propagating signal, such as used by antennas 270, 272, is defined as an electromagnetic signal comprising both electric and magnetic field components that is generated by supplying a radio frequency alternating current to an antenna at a transmitting device to generate a signal that self-propagates (i.e., a radiating wave), such that the signal can be successfully received at an antenna at a receiving device at distances of well over six inches. Contrast this to the non-propagating signal, used by antennas 260, 262, that is defined as a signal having a substantially magnetic field component or a substantially electrical field component but not both, which obeys a $1/r^6$ propagating law, wherein the non-propagating radio signal power falls off at a rate of about $1/r^6$ where r is the distance between the transmitting and receiving antennas. As mentioned previously, with the appropriately sized NFC antennas 260, 262 and power levels, a non-propagating signal is localized to its source.

As an example of a usage case, radios can be rekeyed based on changing groups or events. A smaller police department, for example, can utilize the key encryption to make it difficult for criminals or scanner enthusiasts to monitor communications within the department. The problem of re-keying the radios is no longer a logistical issue for different department shifts. In a police SWAT team, or for a "special event", it may be very desirable to re-key radios on-the-spot to minimize the chance unauthorized monitoring, even by other police radio users not on the team dealing with the event.

As another example of a usage case, a rental radio provider may provide radios which offer basic encryption for increased privacy. Accordingly, it is desirable to re-key the radios for each event. In this market, key provisioning should require minimal effort, inconvenience, or equipment to ensure rapid, on-the-spot key provisioning.

A group re-keying, for example, might include radios utilized in a small police department as a means to periodically update a traffic key to maintain secure communications. If a key is compromised, the radios can be re-keyed very quickly and easily without the use of cables. An event re-keying, might be for example, police radios being used to handle a motorcade event being re-keyed to cover a concert. Thus, the same radios can then be used for a different event using a different key. Advantageously, the various embodiments allow secure distribution of traffic keys without the need for external hardware, cables, and other devices. Such distribution is provided by data transfer via the non-propagating signal. The various embodiments also allow on-the-spot generation of a key or keys for subsequent distribution. Restrictions can be used to limit the type or number of distributions.

Figure 3:
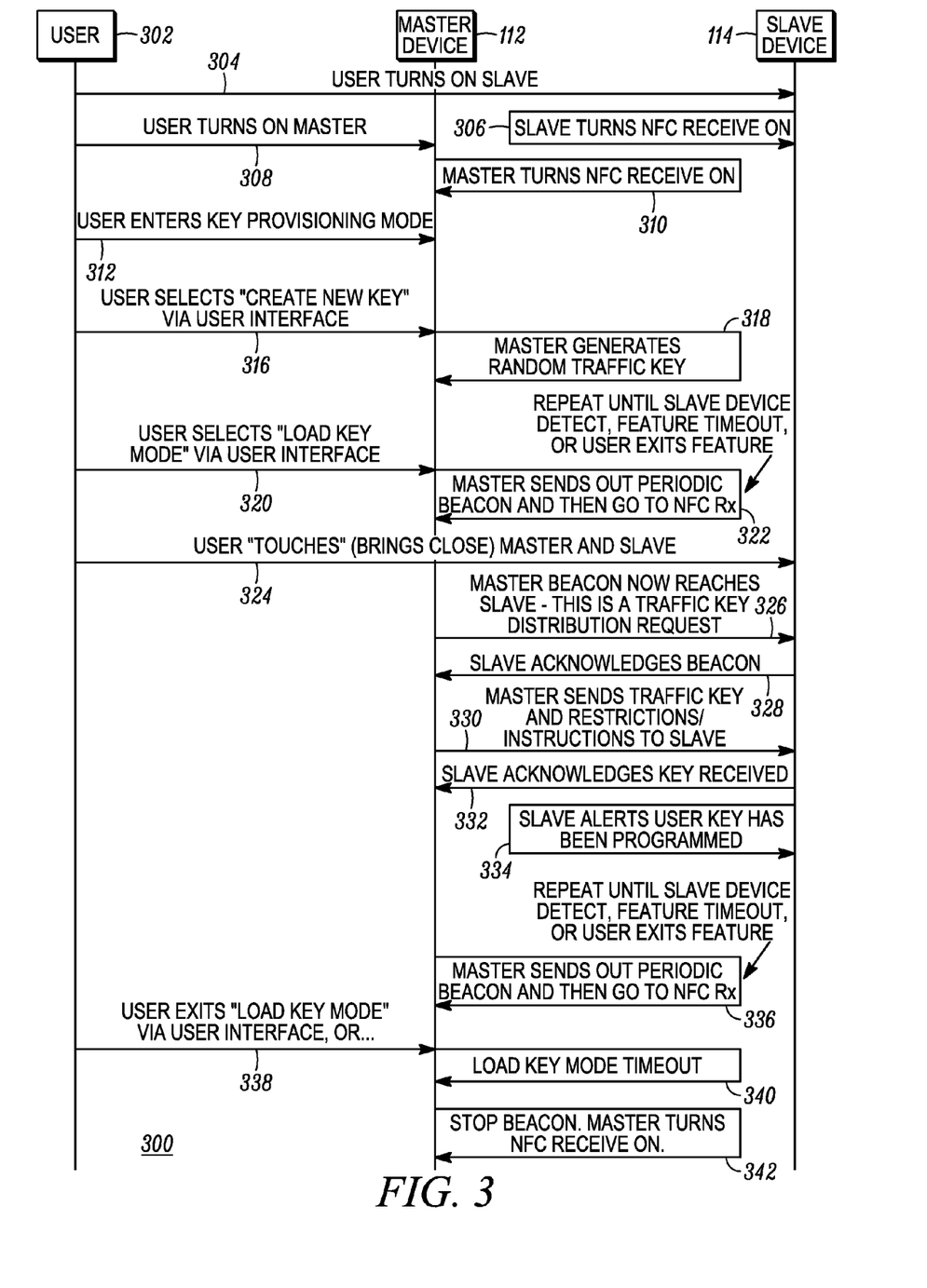
FIG. 3 is a message sequence chart depicting the key provisioning process using near-field communication in accordance with some embodiments.

FIG. 3 is a message sequence chart 300 that can be used by a radio user 302 for provisioning traffic keys from a master radio device 112 and slave radio device 114 in accordance with some embodiments. At 304, 308 the radio user 302 turns on master radio device 112 and slave radio device 114 (order does not matter). In response to being turned on, the slave radio 114 turns on its near-field communication transceiver at 306, and the master radio likewise turns on its near-field communication transceiver at 310. Turning on the near-field communication transceivers of the master and slave radios 112, 114 allows for data to be entered into each device.

Steps 312, 316, and 318 pertain to optional traffic key creation. At 312, a user 302 enters an automatic traffic key provisioning mode at the master radio device 112, via a user interface. This allows for existing traffic keys to be provisioned which will then be loaded/distributed in response to selecting a load key mode at 320.

In this optional approach described at 312, the user may enter the key provisioning mode manually at 314 to request "on-the spot" creation of traffic keys. At 316, the user 302 enters a create a new key mode via a user interface of the master radio device 112, and the master radio device 112 generates traffic keys at 318 in response thereto. The master radio device 112 is now ready to transfer the randomly generated traffic keys to the slave radio device 114.

Step 320 begins the distribution process. At 320, the user 302 selects a load key mode at the user interface of master radio device 112, which results in the master radio device sending out of a periodic beacon over a near-field transmission. The beacon may be sent repeatedly until detected by the slave device 114, or the beacon may time-out after a predetermined amount of time, or the user 302 may alternatively exit the beacon feature if desired. The beacon represents a traffic key distribution request. A traffic key distribution request is a request to distribute the previously generated traffic keys. Neither the request nor the distribution can be established until the two radios 112, 114 are brought within a close enough proximity for near-field pairing via a near-field communication link.

At 324, the master radio device 112 is brought into close proximity or touches the slave radio 114, in accordance with the near-field requirements previously described. The master beacon now reaches the slave radio device 114, with its traffic key distribution request at 326 using the near-field transmitter. The slave radio device 114 acknowledges the beacon at 328, and at 330, the master radio 112 sends the traffic key(s) along with any restrictions to the slave radio 114. At 332, the slave radio 114 sends an acknowledgement (using the near-field transmitter) to the master radio 112 that the traffic key has been received. The slave also alerts the user 302 that the traffic key has been programmed at 334 (e.g. via the user interface).

The master radio 112 sends another periodic beacon using the near-field transmit mode and then switches to the near-field receive mode at 336 to detect additional radios. Here again, the beacon can be sent repeatedly until the slave radio 114 detects the beacon, or the beacon feature times out, or the user exits the beacon feature.

If an additional radio is detected at 336, the master radio 112 remains in the load key mode and distributes the traffic keys (via 326-336) to the additional radio without requiring additional user interaction. This is repeated until no more radios are detected by master radio 112. Once the master radio 112 has distributed all of the traffic keys to all of the radios, the user 302 then exits the load key mode via the master radio's user interface at 328 or alternatively, the load key mode can time out at 340, or the beacon is turned off thereby shutting down the near-field transmitter and turning on the near-field receiver at 342.

While described with the use of a beacon, an alternative embodiment can be used in which the slave device 114 is explicitly placed in a key acceptance mode, for example accessible from within the key provisioning mode. While in the key acceptance mode, the slave radio's 114 near-field transceiver can be actively monitoring for data from the master radio 112. While the beacon embodiment previously described could be turned off, it is also possible that the beacon may be sent continuously upon powering-on the radio device—however this is a less energy efficient approach, so it is preferable to only send beacon(s) upon entry into the load key mode.

The distribution of traffic keys takes place from the master radio 112 to any number of radios such that a group of radios is provisioned with traffic keys. Depending on the level of restriction, keys can be further distributed from radio to radio. The distribution is performed sequentially (e.g. bringing radio 112 within near-field range of other individual radios one at a time). Although simultaneous distribution is feasible (e.g. radio 112 distributes traffic keys to a plurality of radios over the same near-field link simultaneously)—this may require the near field link to be adjusted to accommodate a larger range. For the purposes of localized security, the sequential distribution is preferred. Additionally sequential distribution allows the slave radio 114, depending on the restrictions, to operate as a master and distribute the same traffic keys to other radios. Accordingly, the control is maintained locally.

In previous two-way radio security practices a radio is not normally allowed to share/transfer a key to another radio for security purposes. And, even in cases where such security is permitted, the key is placed/loaded into a key loading device or a laptop running CPS software, and then each radio to be provisioned with the key must contact the CPS or the key loading device. The key provisioning in accordance with the various embodiments however, uses NFC techniques to allow for a radio-to-radio transfer in a secure manner without extra or special equipment.

While the traffic key can be propagated, the traffic key may be configured such that it is not readable or readily retrieved or accessed. A key encryption key (KEK) can be provisioned to encrypt or decrypt the traffic key during the distribution process over NFC.

Accordingly, there has been provided an improved means of provisioning and distributing traffic keys for secure communications between radios. Radios incorporating the traffic key distribution in accordance with the various embodiments can be re-keyed on-the-spot thereby minimizing the chance unauthorized monitoring by criminals or scanner enthusiasts. Logistical issues are no longer a problem as the key provisioning can take place without the use of a PC or laptop to program keys. The ability to re-key the radios on-the spot allows radios to be re-keyed based on an event or team/group. The radios are easily re-keyed for each group or event. This traffic key provisioning requires minimal effort, inconvenience, or equipment to ensure rapid, on-the-spot key re-keying.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A wireless portable radio for secure group wireless communications and including an on-the-spot key provisioning function, the wireless portable radio comprising:
   a long-range radio transceiver for long-range electromagnetic radio communications;
   a near-field transceiver for near-field communications using non-propagating signals; and
   a controller configured to:
     one of create a traffic encryption key and select a traffic encryption key from a plurality of pre-loaded traffic encryption keys as a function of a user input, for encrypting group communications with a plurality of other wireless portable radios; and
     in response to a user request to provision the traffic encryption key, sequentially for each of the plurality of other wireless portable radios:
       transmit, via the near-field transceiver, a traffic encryption key distribution request to the other wireless portable radio;
       receive, via the near-field transceiver and in response to the request, an acknowledgement to the request from the other wireless portable radio; and
       responsive to receiving the acknowledgment, transmit, via the near-field transceiver, the traffic encryption key to the other wireless portable radio.

2. The wireless portable radio of claim 1, wherein the traffic encryption keys are distributed to the other wireless portable radios for a duration of an event.

3. The wireless portable radio of claim 1, wherein the plurality of other wireless portable radios are rental radios that are re-provisioned with new traffic keys for each new rental customer.

4. The wireless portable radio of claim 1, wherein the near-field transceiver establishes a near-field link to the other wireless portable radios via the non-propagating signals.

5. The wireless portable radio of claim 1, wherein the wireless portable radio provisions the traffic encryption keys to the other wireless portable radios without any use of Bluetooth pairing.

6. A method of securing group wireless communications by on-the-spot distribution of traffic encryption keys amongst a plurality of wireless portable radios, the method comprising:
   enabling, by a first wireless portable radio, a first near-field transceiver of a first wireless portable radio for near-field communications using non-propagating signals, the first wireless portable radio comprising a long-range transceiver for long-range communication;
   enabling, by a plurality of secondary wireless portable radios, second near-field transceivers of the second wireless portable radios;
   at the first wireless portable radio, one of creating a traffic encryption key and selecting a traffic encryption key from a plurality of pre-loaded traffic encryption keys as a function of a user input, for encrypting group communications with the plurality of second wireless portable radios; and
   entering, at the first wireless portable radio and in response to a user request to provision the traffic encryption key, a key provisioning mode and, sequentially for each of the plurality of second wireless portable radios:
     transmitting, by the first wireless portable radio via the first near-field transceiver a traffic encryption key distribution request to the second radio via a near-field communication link with the second near-field transceiver of the second wireless portable radio;
     receiving, by the first wireless portable radio via the first near-field transceiver, an acknowledgement to the request transmitted via the second near-field transceiver of the second wireless portable radio; and
     in response to receiving the acknowledgement, transmit, by the first wireless portable radio via the first near-field transceiver, the traffic encryption keys to the second near-field transceiver of the second wireless portable radio.

7. The method of claim 6, wherein the further distribution of the traffic encryption key from the second wireless portable radios is restricted.

8. The method of claim 6, wherein the plurality of second wireless portable radios are rental radios that are programmed and re-programmed for different events.

9. The method of claim 6, wherein the plurality of second wireless portable radios are rental radios, and the further distribution of traffic encryption keys is restricted.

10. The wireless portable radio of claim 1, wherein the non-propagating signals are defined as signals having a substantially magnetic field component or a substantially electrical field component but not both.

11. The wireless portable radio of claim 1, wherein the non-propagating signals are transmitted and received over NFC (near field communication) antennas of the wireless portable radio and the plurality of other wireless portable radios.

12. The wireless portable radio of claim 11, wherein the non-propagating signals obey a $1/r^6$ propagating law, wherein the non-propagating radio signal power falls off at a rate of about $1/r^6$ where r is the distance between the transmitting and receiving NFC antennas.

13. The method of claim 6, wherein the non-propagating signals are defined as a signal having a substantially magnetic field component or a substantially electrical field component but not both, which obeys a $1/r^6$ propagating law, wherein the non-propagating radio signal power falls off at a rate of about $1/r^6$ where r is the distance between transmitting and receiving antennas of the first wireless portable radio and each of the second wireless portable radios.

14. The wireless portable radio of claim 1, wherein the wireless portable radio and each of the plurality of other wireless portable radios are within NFC (near field communication) distance of each other.

15. The method of claim 6, wherein the first wireless portable radio and each of the plurality of second wireless portable radios is within NFC (near field communication) distance of each other.

16. The apparatus of claim 1, wherein the controller is configured to create the traffic encryption key as a function of a user input at the wireless portable radio.

17. The method of claim 6, further comprising creating, at the first wireless portable radio, the traffic encryption key as a function of a user input at the first wireless portable radio.

* * * * *